June 24, 1941.　　　　　H. McCURDY　　　　　2,247,130
NOISE AND WAVE MUFFLING CONDUIT FOR FLUID UNDER PRESSURE
Filed July 9, 1938　　　　4 Sheets-Sheet 1
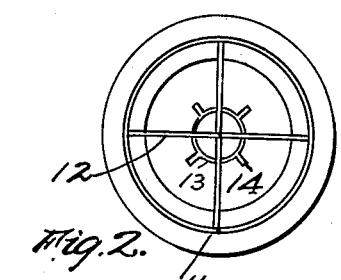
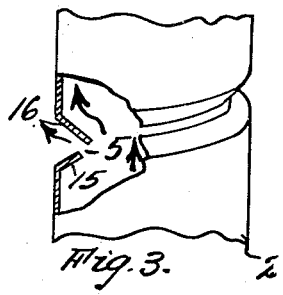
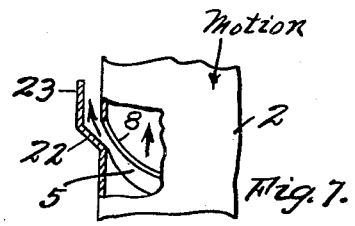
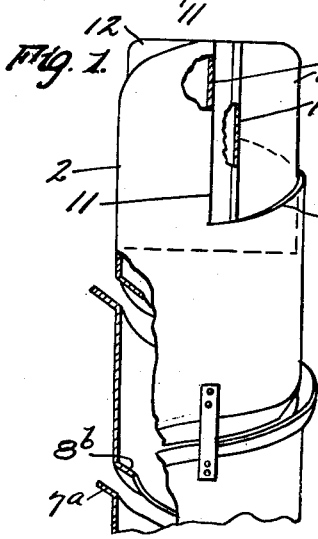
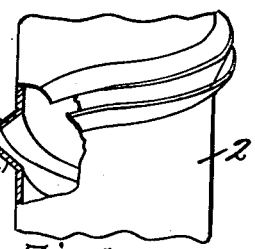
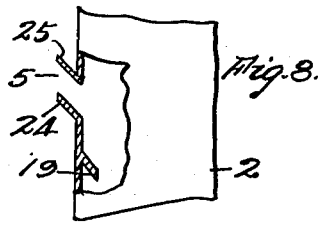
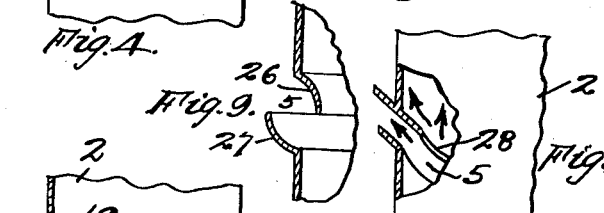
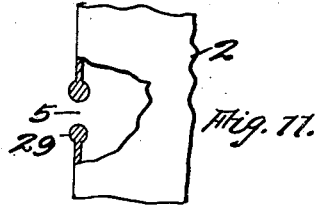
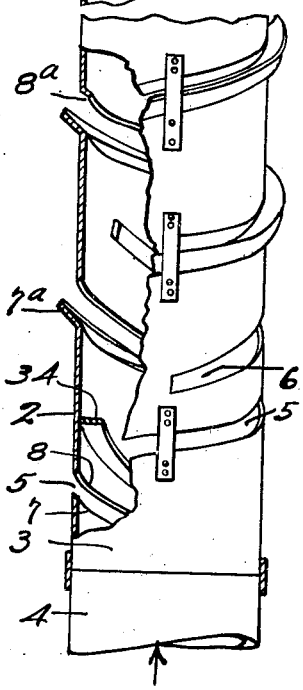
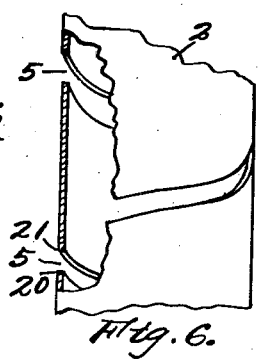
Inventor,
Howard McCurdy
By his Atty
Frederick E. Maynard

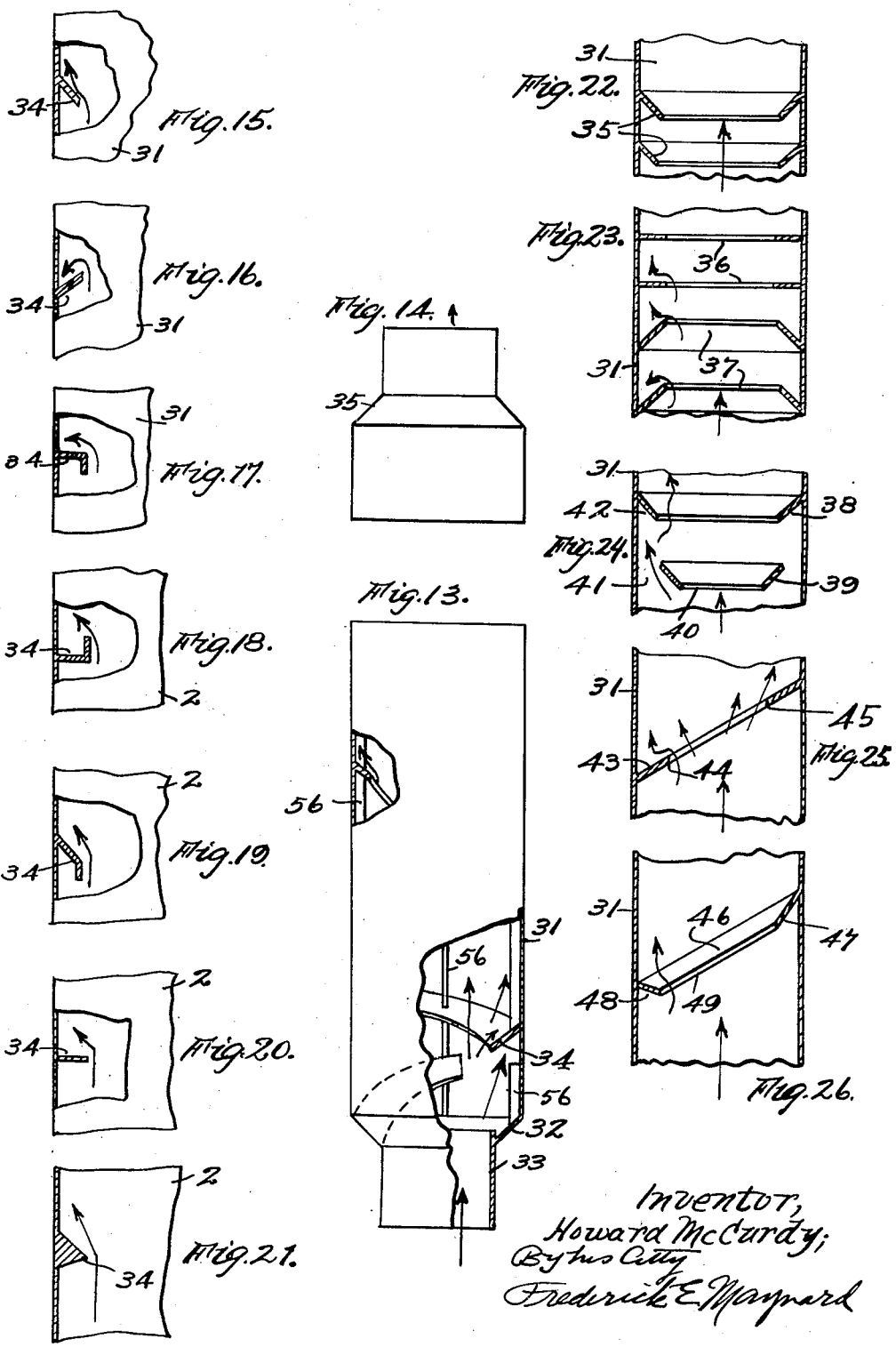

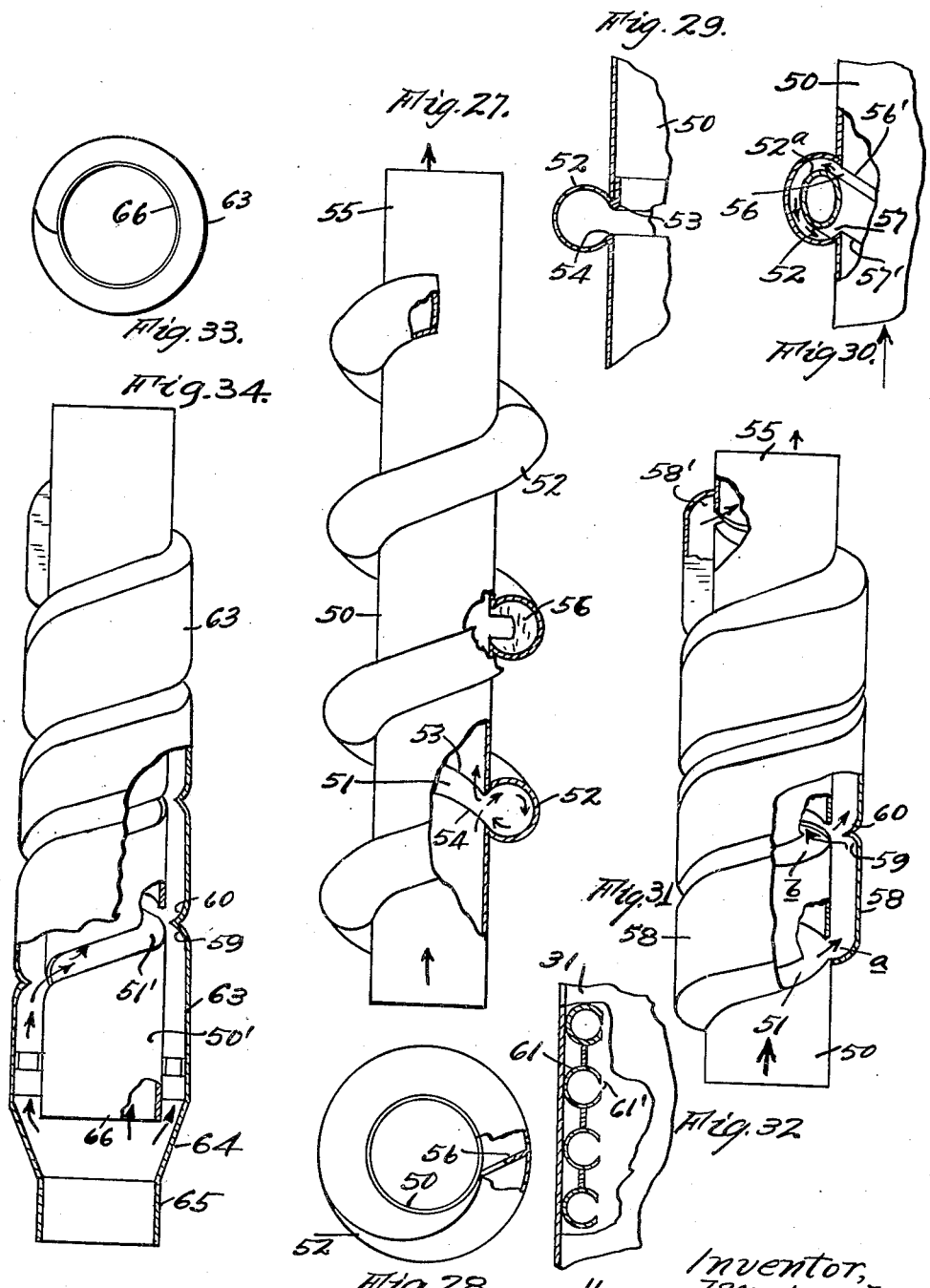

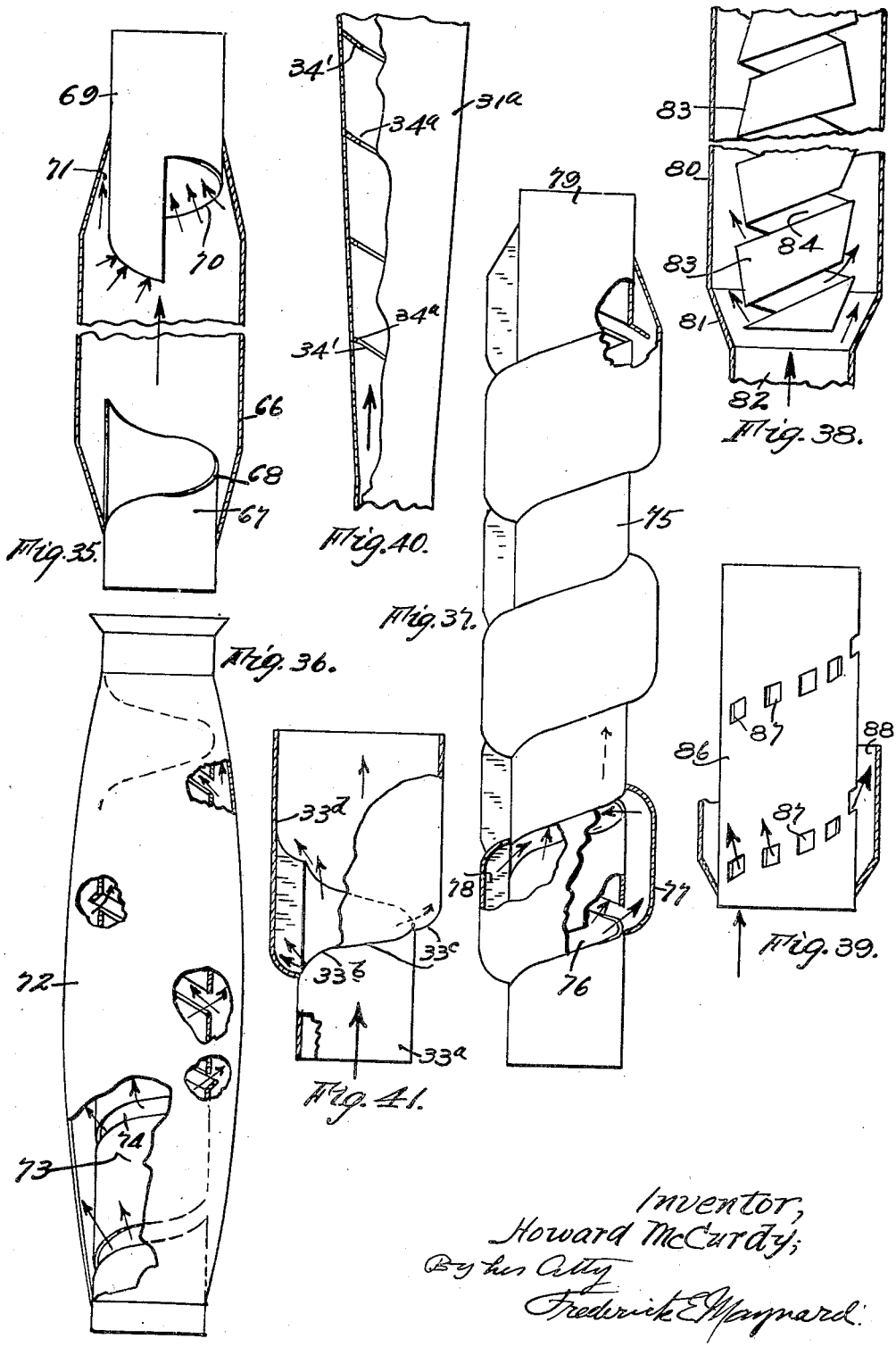

Patented June 24, 1941

2,247,130

UNITED STATES PATENT OFFICE 2,247,130

NOISE AND WAVE MUFFLING CONDUIT FOR FLUID UNDER PRESSURE

Howard McCurdy, Walnut Park, Calif.

Application July 9, 1938, Serial No. 218,376

20 Claims. (Cl. 181—46)

This invention is noise and pressure wave control device, and method for dissipating noise and wave pressure of various pressure fluids passing in a conduit.

Relative to the instantaneous expansion of gaseous fluids there are two serious objections, one being the noise set up as the breast of the pressure wave issuing at an orifice to a materially lesser pressure space and the other being the often, very noticeable air vibrations set up incident to the stimulating force of the released medium being suddenly discharged under pressure.

It is a well known fact that internal combustion motors are so varied in size, number of cylinders, volume of cylinders, speed and frequency of exhaust impulses, and even variations of load at constant running speed with resultant variation in pressure due to variation in required fuel, variations due to types of fuel, to compression and combustion pressures as in various fuel-types of motors, and the variation in the cycles, all effect the temperature and other exhaust phenomena. It is therefore an object of the present invention to provide a method and means having the purpose of most efficiently solving the problem of so controlling the passing stream fluid as to substantially silence sound waves in the met range of frequency and amplitude and at the same time, in those type of apparatus giving off objectionally heavy air or other fluid wave vibrations of any frequency, to substantially negate their potentiality.

It is an object of the invention to provide an effective muffling conduit for the gradual attenuation of a passing pressure wave in a fluid medium to effect its substantially noiseless discharge directly to the atmospheric space or to a deflecting barrier open to said space so as to prevent diffraction of the expanding wave in given directions, as for instance earthward from the exhausting orifice of the conduit.

Further, an object is to provide a muffling conduit of such construction and arrangement of parts as to efficiently operate to exhaust the pressure wave as the frequency of the impulses may increase.

Also it is a purpose of the invention to provide a muffler of closed or diffuser type that during operation there will be retained in the partially expanded stream a sufficient scavenging pressure to overcome atmospheric load.

An object is to provide a means and method for effecting the prolongation or attenuation of a pressure body or wave head by so intercepting the mass that it is prevented from expanding at full pressure or a substantial part thereof in all directions in a common plane when released from the conduit. In this connection it may be stated that it is an object to provide what may be considered as a processional expanding function of a cylindrical wave of pressure fluid as it traverses a conduit in either a lateral vent adaptation to the atmosphere space or in an outer expansion chamber embodiment; the same principle of processional expansion being used.

That is, an object is to provide a muffler, in one form, in which a conduit is provided with a lateral vent provision dispersing the pressure wave in bleeding or stripping action so that the wave is gradually attenuated in strength to an ultimate end opening of the conduit. In this form of the vent there is a generally helical-edge discharge, preferably in the form of an elongate helical slot or one or more over-lapping, that is axially advanced slots, whereby a small part of the wave at the highest pressure is initially let out and the remainder of the wave is let out, as the wave core progresses, at points angularly and axially displaced one from the other about the circumference of the, preferably, cylindrical conduit.

From this it will be seen that a pressure wave will be prevented from hitting the atmosphere either as a full pressure head universally expanding in one plane, from the muzzle of the muffler or as a cylindric head expanding in all directions in a common plane transverse to the muzzle end. On the contrary, the pressure wave will, in the helical vent provision, issue pencil by pencil radially as to a helical line about the axis of the conduit from the beginning or highest pressure lateral outlet point to the remote end of the helical control edge of the outlet.

Still further, an object is to provide in such a muffling conduit, internal means to accelerate or control the slicing off function of the volume of fluid passing in the conduit.

More, an object is to provide a laterally closed form of muffling conduit in which the sliced off annular layer of a wave head is expanded in and returned from an expansion chamber to resume flow therein following the immediate passage or flow of the stimulating body of wave media, and further allowing for the unobstructed flow of the core of the stream at such speed as may be desired to the ultimate outlet for discharge without substantial back pressure and will permit of the resurge back into the conduit of the sliced off portions of the moving wave to unload the expansion chamber before the next frequency wave comes in to be cut down.

The invention consists in certain advancements in this art as set forth in the ensuing disclosure and having, with the above, additional objects and advantages as hereinafter developed, and whose construction combinations and details of means, and the manner of operation, and the method of exhausting the fluid, will be made manifest in the description of the herewith illustrative variants; it being understood that modifications, variations and adaptations may be resorted to within the scope, principle and spirit of the invention as it is hereinafter claimed.

Fig. 1 is a sectional elevation of a helical vent muffler, and Fig. 2 is an end view of the outlet end thereof.

Figs. 3, 4, 5, 6, 7, 8, 9, 10, 11 and 12 are fragmental, sectional elevations of various forms of helical expansion outlets of the muffler.

Fig. 13 is a broken side elevation of a helical-arrestor muffler, and Fig. 14 is an elevation of its converged end dome.

Figs. 15 to 21, inclusive, are detail sections of variant arrestors.

Figs. 22 to 26, inclusive, are detail views of forms of ring arrestors.

Fig. 27 is a sectional, side elevation of right-line, inner tube and outer expansion chamber or shell, and Fig. 28 is a broken end view thereof, and Figs. 29 and 30 show modifications thereof.

Fig. 31 is a broken side elevation of a wide-helix, outer shell and helical-orifice inner tube.

Fig. 32 is a modified form of right-line tube and spaced turns of the expansion shell.

Figs. 33 and 34 are an end and a broken side view of a flared intake form of the inner tube muffler.

Fig. 35 is a sectional side elevation of a tube and outer shell muffler with spaced tube ends.

Fig. 36 is a broken side view of a shell and helical orifice tube muffler.

Fig. 37 is a broken side elevation of a helical-orifice tube with isolated expansion chambers.

Fig. 38 is a sectional elevation of a right-line, helical wall tube and its shell.

Fig. 39 is a sectional elevation of a helical-outlet form of tube and bowl.

Fig. 40 is a broken side elevation of a conical shell and a ribbon arrestor.

Fig. 41 is a sectional elevation of a modified helical-edge shell and tube combination.

Figure 1 is a broken-away elevation of graduated helix, atmospheric-vent, diffuser muffling conduit adaptable for installation on the discharge end of an exhaust pipe or stack, and Figure 2 is a top plan thereof. The word muffler as hereinafter used, for brevity, will be understood as referring to any muffling conduit, characterized by features of the instant invention, for the control and change of sound waves incidental to the flow of various fluids into or from spaces of lesser or greater fluid pressure than that of a mass of the fluid exhibiting a stimulated wave meeting a zone of different pressure, and for the control of fluid pulsations set up by the reactions of one mass on another meeting at different pressures. The device of Fig. 1 is a direct diffusing muffler having a suitably elongate and preferably cylindrical fluid passage or conduit 2 with its inlet end 3 suitably attachable to a given apparatus, such as the exhaust discharge pipe of a combustion motor 4. It is desirable that each successive, pressure stimulated gas wave shall be subjected to a noise reduction or elimination reaction and at the same time the pressure wave will be allowed to proceed to an ultimate discharge in such a manner that in cases where necessary, the finally released pulsation will be substantially nullified.

With this in view the passage 2 is provided with a sinuous edge, radially venting outlet provision, continuous or interrupted such as the orifice 5 shown as of helical advance along the wall of the bore of the conduit 2 and which may be either of uniform or irregular line in one pitch turn or the pitch of which may vary in the length of the helix, and further, whose width between opposite edges ( of the orifice) may vary in an obvious manner. Further, the venting provision may include separate helices having different starting points and being in overlapping position as the second helix 6, overlapped a part of the first helix 5, Fig. 1.

It is understood that the mufflers may vary in dimensions and reaction features according to the great variations of the innumerable kinds and operating functions of various apparatus with a given muffler is to be combined. In Fig. 1 the start of the helical orifice has simple, opposite edges 7 and 8, the latter facing the incoming stream and serving to slice off the rim band of the instant pressure wave for its free diffusion to the outer atmospheric space; this being an open, laterally discharging form of the invention. The front edge 7 of the orifice 5 is the overflow or bleeder edge or lip. The advancing wave then passes as a partially expanded core to another pitch portion of the orifice shown as having the bleeder lip outwardly and upwardly flared at 7$^a$ opposite to a plain portion of the continued edge. Further along the orifice 5 has, opposite the flared edge 7$^a$, the cutting edge somewhat inturned at 8$^a$ to increase the degree of further attenuation, and still further along the cutting edge is more deeply inturned into the flowing core to take out more of the wave, as at 8$^b$.

With any suitable adaptation of lateral discharge orifice 5, or without it, the muffler may be provided at its ultimate outlet end with an exhaust opening transverse to the conduit 2 and the edge of which is characterized as sinuous or helical to any desired length as is indicated at the helix 10, beginning at the near end of a longitudinal side line 11 and ending at the extremity thereof. Such a form of edge for the exhaust passage will cause the passing pressure wave to start dissipating at the nearest point on the helix 10 and such dissipation will continue pencil by pencil at each point on the helix to its end. Obviously the length of the helix and the size of the conduit (its diameter) may be regulated by the character of the passing wave so that this will be finally let out at the end of the peculiar edged orifice at desired pressure above atmosphere substantially without noise and expansion pulsation.

In order to reduce any tendency of the pressure wave to react on the exposed concave face of the bore of the conduit or muffler 2 and puff excessively in one general direction means are provided for the length of the helix 10 to form a back abutment more or less diametrically disposed between every processional point along the helix and the diametrically opposite bore face of the conduit to form a reaction base for each pencil of pressure in the wave about the axis of the conduit. Such means embodies a plurality of evenly spaced, radial blades 12 which if preferred may spring from, that is base on a central stream carrying tube 13 which is provided with sub-blades 14 tending to longitudinally guide the core of the stream moving toward the outlet terminal. The blades 12 may be extended to the axis of the tube 13 or may be omitted, and the tube itself may be omitted if so desired.

Figures 3, 4, 5, 6, 7, 8, 9, 10, 11 and 12, are fragmental sections of variational forms of cutting and lip edges for the muffler orifice 5. In Fig. 3 both of the edges 15 and 16 are inturned, the latter to the larger degree to accentuate layer slicing degree. In Fig. 4 both edges 17 and 18 are outturned and are convergent. In Fig. 5 there is provided an inwardly directed, helical slicing barrier 19 at a location suitably beyond the relative helical orifice 5, whose lips may or may not be deflected in any direction. In Fig. 6 the successive cutting lips 20 and 21 are of gradually increased spacing thereby providing one means for the gradual variation of the rate of wave attenuation axially of the muffler. A noticeable embodiment of the discharge outlet 5 of the passage 2 is seen in Fig. 7 wherein the forward or bleeding lip 22 is extended outwardly to a suitable degree and is then extended in spaced relation at 23 to form a bell or bowl ending beyond the cutting lip 8. This form is particularly adaptable for mufflers used on vehicles operating at such speeds in space as to exert a vacuum tendency in the orifice 5 of the exhaust.

In Fig. 8 the orifice lips 24 and 25 are outwardly and rearwardly oblique and parallel about the relative orifice 5, and contiguous thereto is an inturned bore-surface barrier 19. Figure 9 illustrates an inturned, concave-convex orifice lip 26 at the cutting edge side of the orifice 5, the concave face toward the incoming wave. At the opposite edge the bleeder lip 27 is of similar form and presents the concave face rearwardly; the edges of the two lips 26—27 being here shown as on a common radius from the axis.

Fig. 10 shows a variant in which the cutting side of the orifice 5 is provided with an inturned slicing lip 28 which is prolongated in its plane outwardly beyond the wall of the passage 2.

It is desirable that the edges of the exhaust of the muffler in its several forms be provided with practical means for eliminating annoying whistle noises in cases where the escaping fluid might so react and in Fig. 11 a device as a thickened wall edge 29 is shown to accomplish that result.

In Fig. 12 the bleeding lip 30 is outturned and presents a convex upper surface to gases issuing from the outlet 5.

There are cases of installation where it may be more desirable to break down the passing wave and eliminate noise by causing the processional, continuous, gradual expansion by fractionally slicing off annular layers of the pressure wave while confined within an elongate chamber provided with means to thus shave off the outer band of the wave in progressive stages. Therefore, Figure 13 is a broken-away elevation of an elongate expansion shell 31 whose inlet end is flared annularly at 32 from an engine pipe 33. Fixed along the bore face of the shell is an inwardly directed sinuous or helical barrier 34 of suitable cross-sectional form and of any desired attitude as to the diameter of the shell. The helix 34 may be of any desired pitch and regular or irregular, and as many turns as wished according to case. It will be seen that the rim of an incoming, annular pressure wave will be processionally carved off during its traverse of the first turn of the helix 34 as the wave expands in the enlarged entrance 32. The thus reduced wave advances to and through the next full helix turn meanwhile expanding in volume and reducing speed whilst that part of the wave which expanded in front of the first helix turn returns of its own pressure and also inductively back to the axially free bore space of the shell and follows on back of its parent wave; this phenomenon keeping up for an individual wave until it issues substantially noiseless and without impulsing potential to the atmosphere of space or other lesser fluid pressure body. When the shell 31 can be exhausted at its far end to the atmosphere it may be unconstricted at the distal end, but in other cases the shell is preferably provided with a constricting ring or dome 35.

Figures 15 to 21 inclusive, illustrate divers attitudinal variations of the arresting means 34, each having a front face and a rear face, or combination of such faces as designed to meet particular instances of installation; the same reference numeral being adopted in the said views for the arrest-function barriers 34. As stated at the outset, the great variety of operating differences of different machines with which mufflers are capable of use necessitate structural refinements in the mufflers to meet the cases, and some such refinements are shown in the just described figures of the drawings.

It is within the purview of this invention that the internal fluid barriers may be other than sinuously progressive, for instance, Figure 22 is a sectional detail in which frusto-conoidal, contiguous, downwardly or stream-facing rings 35' are diametrically set across the shell 31. Figure 23 shows contiguous, flat annuli 36 preceded by a contiguous, diametrical set of parallel, frustum annuli 37 coaxial with the shell 31. Figure 24 is a section showing an inverted frustum annulus 38 with its rim based on the core face and in backed off relation to a smaller, likewise inverted, frustum annulus 39 which forms the first slicing lip 40 for a passing fluid wave which is thus annularly, partly thrown off in front of the successive barrier ring 38 from which it resurges centripetally to flow on in wake of the parent wave mass that has passed through ring 38. In this embodiment, there is formed about the leader ring 39, whose rim is spaced inwardly from the core face of the shell, a by-passing capacity in the annular zone 41 externally of the ring 39. The annular fragment of the passing wave at ring 39 flows to and is abruptly pocketed by the reentrant recess 42 wherein the incidental noise is substantially absorbed as the cushioned impulse wave is recoiled for absorption itself into the tail of the passed-on parent wave body.

Figure 25 is an axial section in which the barrier means in the shell 31 takes the form of flat or para-plano ungula or diagonal ring 43 pitched rearwardly as to stream flow and which will function to processionally slice the pressure wave. That is the crest of the wave will first be affected by the foremost point 44 of the aperture of the diagonally arranged ungula and the remainder of the rim of the wave will expand at chordally opposite points where the chords are transverse to the flow axis of the stream and are in planes from the point 44 back thereof to the final cutting point 45.

Figure 26 is a sectional detail illustrating an ungula form of ring barrier 46 whose forward face 47 pitches forwardly at all points from its base joint with the bore face of the shell 31 to form a positive recoiling or cushion pocket 48 for the sliced off perimeter of an instant pressure wave. This form also has a processional, wave rim or band cutting off action as the wave mass advances axially through the obliquely disposed cutting edge 49 of the barrier 46. It is understood, in review, that the physical details of attitude, pitch, face width, and spacing individually or contiguously grouping of the ungulae forms of the barrier may be much varied for adaptions.

While Figs. 14 to 26, inclusive, show a shell having interior means for effecting a progressive attenuation of wave power by successional slicing reaction on a given passing wave and the centripetal resurge of each sliced off part of the wave as the reduced stimulus parent body or core may slide on axially of the conduit shell a variation may be employed in which the shell or conduit shall be provided with a laterally related device forming an outward expansion space in confined relation to the passageway of the muffler shell.

Figure 27, therefore, is broken elevation of a form of muffler in which the elongate passage 50 has a helical orifice 51 of suitable width in its bore face and continuously opening into a like helical expansion chamber 52 which in its preferred form is of more or less circular cross-section and is chordally cut at one side for open junction with the relative opposite cutting edge or lip 53 and the forward bleeding edge 54. It will be seen that the rim of an incoming pressure wave will tend to flow or bleed off the first edge part 54 and also that the rim will expand into the outwardly opening orifice 51 so that the primary rim or layer of the wave at highest pressure will slice out into the near length of the chamber 52. The reduced pressure wave will pass on along the bore for repeated slicing action at the successive points along the cutting edge 53 of the orifice; meanwhile that part of the wave which has expanded into the successive portions of the helical chamber 52 will resurge centripetally and follow on through the bore of the passage 50 to ultimate discharge end 55. If so desired baffles 56 may be interposed radially in the chamber to prevent the undue retention and gliding of such fluid stream as will expand thereto; in some cases such baffles may be aidful.

Figure 28 is an inlet-end view, of the muffler of Fig. 27.

Figure 29 is a detail section of the expansion device of Fig. 27, and shows the cutting edge 53 thickened to reduce whistle effect and set inwardly as to the frontal edge 54 to increase the slicing efficiency.

Figure 30 is a sectional detail of a modified form of the exterior expansion chamber 52. In this the chamber is much axially widened and therein is arranged a generally elliptical-section core or filler 52ᵃ at the ends of which are formed two openings; one being indicated at 56 in front of a slicing edge 56' of the bore face of the passage 50 and the other indicated at 57 along the frontal bleeding edge 57'. The action of the pressure wave in this form of expansion chamber is that the rim of the annular wave will slide past the opening 57, glide across the near face of the filler 52ᵃ and will slice outwardly into the opening 56. The sliced layer will then flow around the outer surface of the filler and will expand or surge back into the bore of the passage 50 to follow the parent wave.

Figure 31 is a broken side elevation of a modification in which the passage 50 has a helical orifice 51 in helically continuous communication with an elongate, exterior expansion chamber 58 into which a parent wave is processionally sliced as it advances axially of the uninterrupted bore. The wall face of the chamber 58 is preferably provided with a means continuing helically opposite the concentric orifice 51 and operating to deflect the outpouring slice longitudinally in the chamber toward the far end 55 of the passage and presenting an inturned forward face 59 to deflect the expanded slice of the wave back into the bore to follow the parent. A wave expanding into the chamber 58 at *a* will be decelerated and will flow toward face 59 wtih such lag as to allow the parent wave having more velocity, to again slice and expand out or at the next turn *b* of orifice 51 without interference of the lagging wave part coming toward face 59. The wave part *b* flowing toward face 60 will be aided thereby in rearward flight.

It is understood that the form and proportions of the communicating muffler bore and the related expansion chamber will in all embodiments be so designed to effect unloading recoil of the sliced out wave parts in the period of time between wave frequencies. In Fig. 31 the initial portion of the helical orifice, to a suitable degree is utilized only for the outflow of fluid to the relative or contiguous part of the expansion chamber 58, then for a suitable length the orifice will first serve to pass out expanding, sliced-layer fluid from the axially moving stream, and will also serve in sequence for recoil of fluid, and finally that portion of the orifice 51 nearer to the free discharge end 55 of the passage will serve only for inflow from the tail of the expansion chamber to the outlet 55, see arrows, Fig. 31; 58' being a sound trap.

Figure 32 is a cross-section of an interior form of expansion means fixed along the bore wall of the shell 31. This means consists of a cylindric tube 61 which is cut open on a chordal line at 61' parallel to the axis of the muffler shell 31; the tube being arranged in helical or annular line as may be desired with the chordal mouth in desired relation pitch or spacing axially of the shell. In this embodiment the annular rim of a pressure wave will slice off at the far edge of the mouth 61' and as the parent wave passes on the slice will rotate in the tube 61 until the wave pressure has subsided and the slice can recoil into the bore of shell 31 prior to the next frequency.

Figure 33 is a top end plan, and Figure 34 is a broken side elevation of a variant form in which there is an expansion drum 63 enlarged by a throat 64 from an inlet neck 65 and being elongate. A feature of this embodiment is the provision of an inner, spaced concentric passage 50' having an open inlet end 66 at the throat 64 for the free inflow of the pressure fluid from neck 65. This passage 50' has a helical or sinuous orifice 51' with plain or other shaped opposite lips (as variously disclosed herein above for given cases). It will be seen that the cylindric wave coming in will expand in throat 64 into the drum 63 so that the stream wave will annularly pass out the near end of the passage 50' and flow along the bore of the drum while the uncut core of the wave will advance to the rear in the unobstructed passage 50'. As a given wave passes the pitch turns in succession its rim continuously slices out through the orifice 51' to expand in the space of the drum 53 and then to recoil back into the passage 50' to trail the leading parent wave. The drum is preferably provided with bore face means as 59—60, Fig. 31, to facilitate directed inflow of the expanded fluid to the orifice 51' from the drum space.

Figure 35 is a sectional elevation of a form of the invention in which there is provided a barrel 66 contracted at one end to join an exhaust pipe nipple 67 at a circumferential line back of the outer end of the helix 68 forming the discharge edge of the inner end of the pipe nipple 67 over which the pressure wave will processionally advance and radially discharge pencil by pencil as above set forth. The opposite end of the barrel 66 converges to and annularly joins on an inwardly projected, concentric outlet muzzle 69 having a helical edge 70 for progressive retarded outflow of the expanded fluid from the expansion barrel 66; this terminating far back enough on the muzzle 69 to form an annular sound choke pocket 71.

Figure 36 is a sectional elevation of a modification in which a drum or barrel 72 converges at each end to and joins the inlet and outlet ends of a continuous passage 73 having a sinuous or helical expansion orifice 74 whose opposite edges or lips are suitably contoured as adaptation may require for given wave treatment.

Figure 37 is a sectional elevation of a muffler in which a central passage 75 is provided with a continuous or substantially continuous helical orifice 76 (suitably edged). The feature of this form is that each full turn of the helix from the first is provided with its own individual, like pitch, helical expansion chamber 77 which is of a length to embrace two stretches or portions of its helical orifice as is clearly shown in Fig. 37. The terminal end of each chamber 77 is longitudinally closed by a blind wall 78 meeting the start of the next succeeding chamber in a manner so that the expanded part of a wave in each chamber 77 will recoil back into core passage 75 toward the discharge end 79 of the passage 75.

Figure 38 is an axial section of a muffler in which a barrel 80 flares at throat 81 from the inlet nipple 82. Fixed in the barrel 80 is helically twisted strip 83 with its edges suitably axially spaced to form a helical orifice 84; it being observed that the thickness of the wall forming strip is oblique convergently or inwardly toward the axis and the inlet end of the muffler. The obliquity of the helix 83 is reversed at the discharge end of the barrel.

Figure 39 is an elevation of a form of muffler passage 86 in which the outlet provision is in the form of a series of independent apertures 87 in a sinuous or helical line in the wall of the muffler; which may be directly open to atmosphere, or enclosed in a surrounding barrel, drum or shell, or open outlet bowl 88 whereby to diffuse the expanded wave upwardly from the surrounding horizontal plane.

Figure 40 is an axial section showing a shell 31a of conical expanding function having a slicing lip 34' with uniform diameter, unobstructed bore passageway along the concentric edge 34a.

Figure 41 is a sectional elevation showing the inlet 33a terminating in a helical edge 33b of one turn and to which the bulge 33c of an expansion shell 33d is joined.

What is claimed is:
1. A muffling conduit tube for fluid under pressure having a peripheral opening with an edge lying oblique to the bore axis and over which the passing fluid may processionally flow laterally as to the axis, and an expansion chamber member concentric to the tube and receiving the radially outflowing fluid and connected to the conduit to return the expanded fluid subsequent to the passage of the initial pressure of a fluid wave and the surface of the bore of the tube being substantially right line axially of the tube.

2. A muffler as in claim 1, and in which the surface of the member opposite to the opening is shaped to stop reverberation of waves at the opening and is indented toward the opening.

3. A muffling conduit tube for fluid under pressure, having a wide pitch, narrow helical orifice along its bore face, and a lateral expansion chamber shell combined with the conduit tube and receiving the fluid expanding over an edge of the orifice and returning it to the conduit sequentially and the wall of the tube being substantially straight lined axially.

4. A muffling apparatus including a conduit tube having an expansion orifice in its bore face, and an expansion chamber device conforming to the line of the orifice through which the breast of a wave first expands and which expanded part then follows back into the tube passage; the edge of the orifice facing the wave being nearer to the axis of the tube than the opposite edge so that a line longitudinally of the tube and joining the two edges is inclined to the said axis and the pitch of the chamber being greater than its diameter axially of the tube so that the coils of the chamber are spaced.

5. A muffling conduit for fluid under pressure, having in combination, an inner, tubular element having a stream carrying passage for an incoming pressure wave and a chamber concentric to the passage, and the element including outlet means for processionally dissipating the breast of the wave in pencils radial and successively helical to the passage axis, the wall of the said element being a right line axially.

6. A muffling conduit tube for fluid under pressure, having a stream carrying passage for an incoming pressure wave provided with a lateral exhaust outlet with a wide pitch helical edge for preventing the expansion of the breast of the passing wave in any material angular arc in one plane, the wall of the tube axially being a right line to effect smooth axial flow.

7. A muffling conduit tube having a helical expansion orifice along its bore face and a helical wall element forming an expansion chamber conforming to the line of the orifice and through which orifice the breast of a passing pressure wave first processionally expands and the expanded slice then follows back into the conduit as the higher component advances along the conduit passage; there being an axial flow passageway between the exterior of the tube and the helical element and the latter being imperforate.

8. A muffling conduit tube having a central stream flow passage and a helical, expansion chamber element therealong and in communication therewith along a helical orifice at a tangential line of contact at the inner side of the element and through which orifice the breast of a pressure wave expands in radial pencils and through which orifice the expanded portion passes back into the passage immediately following the passage of the expanded part of the passing wave, the wall of the tube being a right line axially.

9. The muffler of claim 8, and in which means is provided in the expansion chamber to intercept helically moving fluid therein.

10. A muffling conduit tube having a stream flow passage, an expansion chamber element thereabout, and a helical orifice device for processionally discharging radial pencils of the fluid to the chamber; the chamber element being a helix having a coil width of at least a plurality of pitches of the orifice helix so that some of the stream fluid will move only outward to said chamber, some will flow both out and in at a portion of the orifice and at the end part of the orifice remote from the entrance the expanded fluid only will flow inward.

11. A muffling conduit tube having a stream flow passage having a helical expansion orifice along its bore face, an elongate expansion shell about and spaced from and along the tube to form a longitudinal flow chamber along the tube, and inwardly directed means opposed to the orifice to facilitate directional flow of a layer of the passing fluid stream outward and rearward in the chamber and the subsequent reversed inward flow of the expanded wave part as the breast of the wave advances.

12. A muffling conduit tube having a stream flow passage provided with a helical expansion orifice, and an expansion chamber shell about the tube and having a flared inlet throat clear of and contiguous to the inflow end of the tube for the free outward expansion of an annular layer of the stream in all directions in planes transverse to the throat; whereby the first expanded layer of a stream wave will longitudinally traverse the fore end of the chamber and will sequentially flow into the near portion of the orifice whilst the remainder of the passed wave in the tube will be expanding at other portions of the orifice further along the helix.

13. The muffler of claim 11, said means being a ceratoid cusp to facilitate first expansional flow and then the reverse centripetal or follow flow after the breast of the relative wave has passed.

14. A muffling conduit tube having a stream flow passage provided with a continuous, helical expansion orifice, and an expansion chamber shell helically spaced about and conforming to the line of the orifice and of a helical width embracing portions of two successive orifice turns.

15. A muffling conduit tube having a stream flow passage provided with a helical outlet, along its bore face, of a plurality of pitch turns, and an individual expansion and return chamber unit for each turn of the outlet.

16. A muffling member having a stream flow passage, an expansion chamber shell for a pressure wave passing through the passage, and a sound wave trapping pocket at the far end of the chamber intercepting the advancing, expanded part of the pressure wave, the member having a helical-edged outlet to the shell.

17. A muffler apparatus comprising, in combination, a flow tube provided with an annular expansion orifice in its bore wall, and a laterally disposed, expansion chamber element in communication through the orifice to the tube passage; the chamber face of the element being so shaped as to produce an orbital cycle in a radial or transverse plane of the chamber, of the annular portion of a wave expanding thereto, and the opposite edges of the orifice being axially spaced along the wall of the flow tube and the tube having right line wall parts axially between the turns of the orifice.

18. A muffler having a conduit tube provided with lateral expansion chamber element thereabout, and a ward disposed in spaced relation in the said chamber and at opposite ends of which ward there is provided an orifice for the expansion to and by-pass in the chamber and thence recoil to the conduit.

19. A muffler conduit tube having fixed along its bore surface successive expansion shell chamber which open into the bore in angular mouths whose lips are on chords, of the chambers, directed along the bore axis.

20. A fluid control muffler including a tubular inner member forming a bore for axial flow of fluid and which member is of right line wall section axially of said member and the latter having a lateral, annular exhaust orifice, and an expansion chamber element spaced concentrically thereabout and to and from which said orifice leads as to the said bore.

HOWARD McCURDY.